United States Patent [19]

Morris

[11] Patent Number: 4,593,711

[45] Date of Patent: Jun. 10, 1986

[54] PRESSURE AND VACUUM RELIEF VALVE MECHANISM FOR A FLUID STORAGE TANK

[75] Inventor: Carrol V. Morris, Cosby, Mo.

[73] Assignee: Mercury Metal Products, Inc., Schaumburg, Ill.

[21] Appl. No.: 677,290

[22] Filed: Dec. 3, 1984

[51] Int. Cl.[4] ............................................. F16K 17/36
[52] U.S. Cl. ...................................... 137/39; 137/43; 137/493.3
[58] Field of Search ............. 137/39, 43, 493.3, 493.2, 137/493.4

[56] References Cited

U.S. PATENT DOCUMENTS

| 1,893,942 | 1/1933 | Jensen | 137/43 |
| 1,942,630 | 1/1934 | Woodbridge | 137/43 X |
| 2,016,278 | 10/1935 | Ehlers | 137/43 X |
| 3,757,987 | 9/1973 | Marshall | 137/43 X |
| 3,938,692 | 2/1976 | Crute | 137/43 X |

FOREIGN PATENT DOCUMENTS 1285733 8/1972 United Kingdom ............. 137/493.3

Primary Examiner—Robert G. Nilson

Attorney, Agent, or Firm—Silverman, Cass & Singer, Ltd.

[57] ABSTRACT

A pressure and vacuum relief valve mechanism which can be installed in a vent opening in the top wall of a fluid storage tank. The valve mechanism includes a valve housing with a central bore therethrough. One end of the bore communicates with the vent opening to ambient atmosphere and the opposing end communicates with the interior of the tank above the stored fluid. A valve seat within the bore. A single, integral valve member is movable in the bore of the housing. The valve member has a valve component or head formed thereon cooperably engageable with the valve seat within the bore for relieving excessive vacuum in the tank interior. The integral valve member also includes a valve seat and a cooperating valve head for relieving excessive vacuum in said tank interior. These valving arrangements normally being biased closed. There is a third overturn valve seat and cooperable valve closure component or head normally operable to maintain this valving arrangement open but operable to close the same when the tank is tilted or overturned so as to prevent leakage of stored fluid through the vent opening.

8 Claims, 8 Drawing Figures

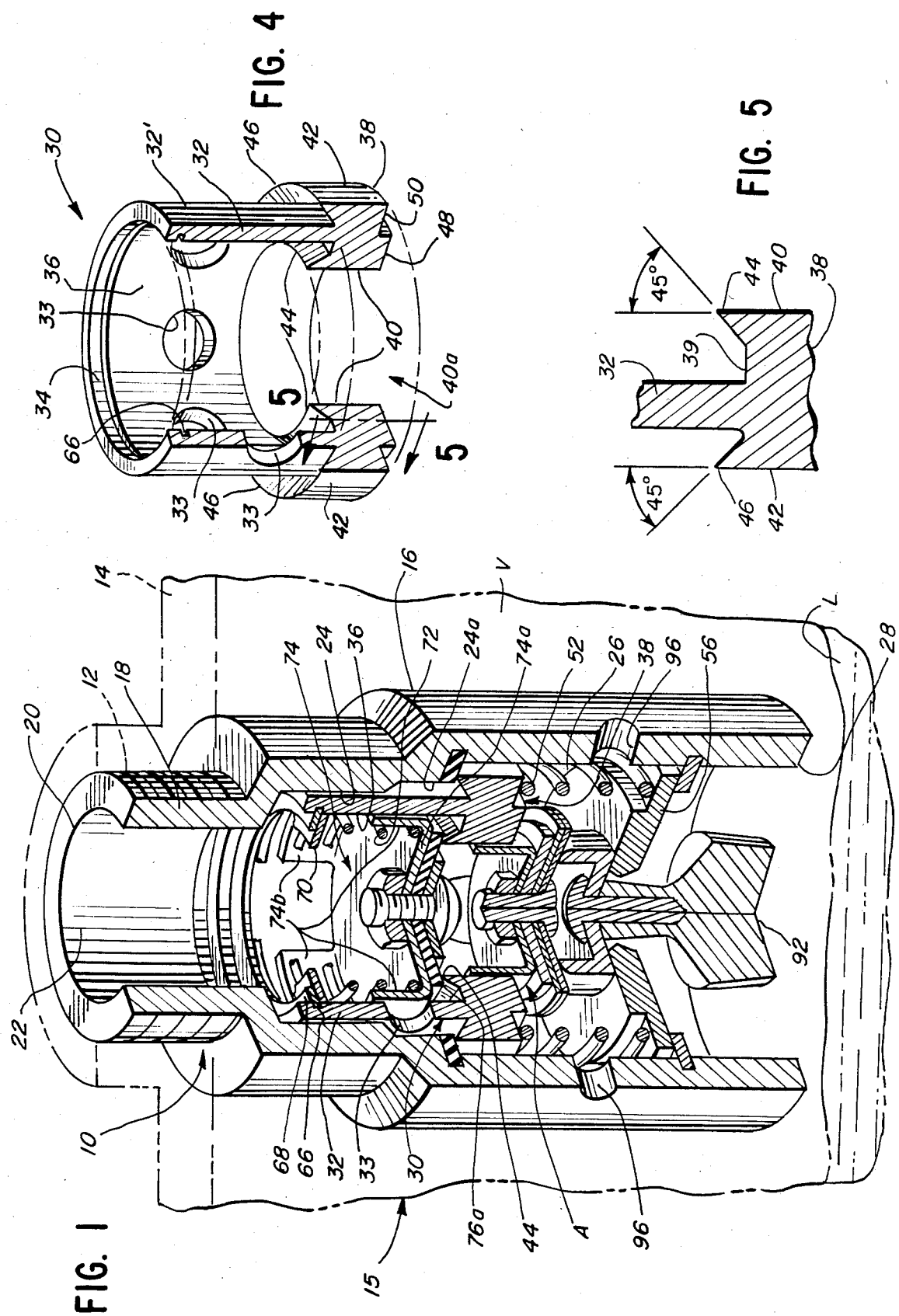

PRESSURE AND VACUUM RELIEF VALVE MECHANISM FOR A FLUID STORAGE TANK

BACKGROUND OF THE INVENTION

This invention relates to relief valves, and more particularly, to relief valves which alternatively relieve either excessive pressure or excessive vacuum within a closed fluid storage tank.

Relief valves of this general type have been developed for installation on both stationary and transportable fluid storage tanks. Such tanks generally contain fuels or other volatile liquids which can produce excessive pressure within the tank caused by ambient temperature or product agitation. In addition, these relief valves have been designed also to relieve a reduced pressure or developing vacuum within the tank resulting from cooling of the fluid product. Examples of such relief valves are described in U.S. Pat. Nos. 3,974,850 and 3,580,275.

In fluid storage tanks employed for transport by truck, rail or ship, the danger from leakage of fluid when the tank becomes tilted excessively or overturned has lead to development of relief valves which will seal in the event of such occurrence. U.S. Pat. No. 3,913,601 describes a relief valve in which the opening to the atmosphere can be closed by a check valve operated by gravity, but this valve only operates when it is completely inverted. U.S. Pat. No. 4,287,910 describes a spring-loaded relief valve designed to maintain a closed position should the storage tank be overturned. However, this valve could open so as to allow undesirable leakage of vapor under normal pressure conditions and upright orientation of the storage tank in transport which is subjected to jolting and bumping. Under these adverse conditions, the inertia of a weighted valve member can compress the biasing spring and thereby, permit the valve to open with resulting leakage of tank contents.

It is believed that these prior patents do not provide a valve mechanism which successfully prevents leakage of tank contents under adverse conditions of transport of the tank and adverse tilting or roll-over of the tank.

SUMMARY OF THE INVENTION

A relief valve mechanism or assembly for relief of either excessive pressure or excessive vacuum within a fluid storage tank has a normally-closed pressure relief valve and a separate normally-closed vacuum relief valve within a single valve housing. The assembly has a single movable valve member which includes integrally formed valve components including a valve seat and a valve head, and cooperable valve closure means for both the pressure relief and the vacuum relief valving functions. The valves are one-way valves normally biased to a closed postion, albeit which are constructed and arranged to be opened independently for the respective pressure relief functions required.

The valve member includes a cylindrical body having a bore therethrough and an enlarged end on which the pressure valve seat and the vacuum valve head are formed as separate annular surfaces. Separate gaskets are arranged each to engage against the valve seat and the valve head, and spring biasing means are provided to maintain the gaskets, seat and valve head so engaged with the valve seats to maintain the valve mechanism normally closed.

When the relief valve assembly is to be installed on a transportable fluid storage tank, a third valve, called an overturn valve, is provided to prevent leakage of the fluid in the event that the tank is accidentally overturned or tilted. The overturn valve can be biased open by gravity in the normal upright orientation of the assembly so that the overturn valve will not accidentally open to cause fluid leakage where the tank suffers jolting in transport. The overturn valve is closed by a separate attitude-sensitive member which moves an overturn valve gasket into engagement with an overturn valve seat when the assembly is inclined to approximately 45 degrees from normal upright orientation and remains closed for all positions of overturn beyond 45 degrees.

BRIEF DESCRIPTION OF THE DRAWING

FIG. 1 is a perspective view, partially broken away, illustrating a relief valve assembly embodying the invention installed within a fluid storage tank;

FIG. 4 is an enlarged, perspective view, partially broken away, illustrating the valve member shown in FIG. 1;

FIG. 5 is a sectional view taken along the line 5—5 in FIG. 4 and in the indicated direction;

DETAILED DESCRIPTION OF THE PREFERRED EMBODIMENT

Figure 3:
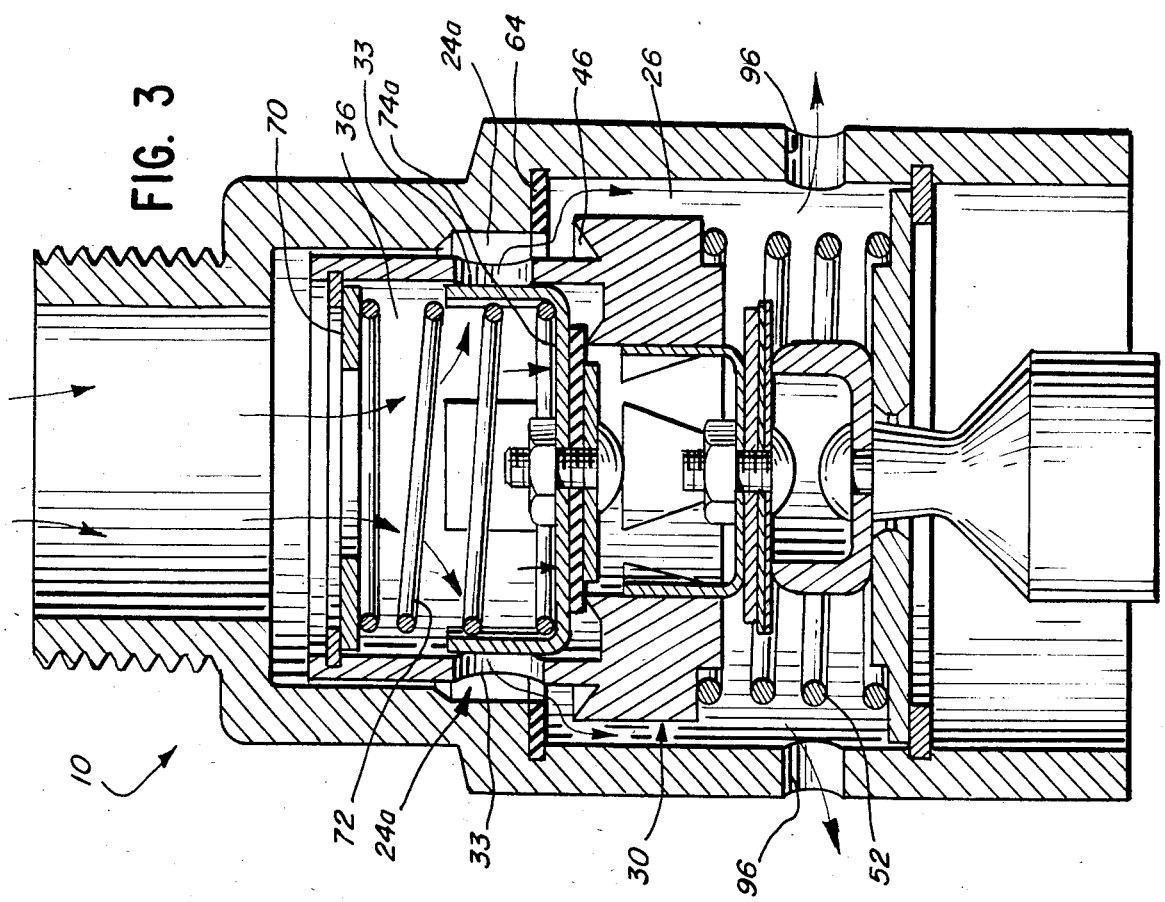
FIG. 3 is a sectional view similar to FIG. 2 and illustrating the open condition of the vacuum relief valve and the fluid flow pattern during vacuum relief.

Referring to FIG. 1, an embodiment of the relief valve mechanism according to this invention is designated generally by reference character 10. In a typical installation, the valve mechanism 10 is mounted in a vent opening 12 formed in the upper wall 14 of a fluid storage tank, for example, a transportable gasoline storage tank designated generally 15 shown partially in phantom outline.

The mechanism 10 includes a generally cylindrical housing 16 having an upper, reduced diameter end 18 which is threaded into the vent opening 12 when the mechanism 10 is installed. The housing 16 is fabricated preferably from metal, for example, aluminum alloy. The end 18 is the upper end in the normal upright position of the housing 16, as illustrated in FIG. 1. The end 18 has an opening 20 to ambient atmosphere exterior of the tank 15.

The housing 16 includes a series of three coaxial bores 22, 24 and 26 extending therethrough. The sleeve bore 22 is formed through the upper end 18 and extends to the opening 20. The guide bore 24 communicates between the sleeve bore 22 and the lower bore 26 which opens at 28 at the opposite end of the housing to the vapor V in the interior of the tank above the stored liquid L in the tank.

Referring to FIGS. 1 and 4, a generally cylindrical valve member 30 is slidably mounted within both the guide bore 24 and lower bore 26. Member 30 comprises an elongate, cylindrical body 32 having six transverse apertures 33 or conduit parts therethrough and a bore 36 extending entirely through body 32 which opens at the upper end 34 thereof. An annular boss 38 is integrally formed at the enlarged opposite or lower end of the body 32. The boss 38 provides an interior annular surface 40 and an external annular surface 42 which are concentric and which extend parallel to the circumferential wall of the body 32, as best illustrated in FIG. 5. A pair of valve components are formed on said boss extending upwardly on opposite sides of the circumferential wall 32' of the body 32. The boss 38 is undercut in its upper end 39 and beveled or slanted approximately 45 degrees to form an upstanding pressure valve seat 44 and an upstanding vacuum valve head 46 on opposite sides of the wall 32'. The free, annular extremities of the respective seat 44 and head 46 lie in substantially the same transverse plane. Although illustrated as providing sharp, tapered extremeties, the valve seat 44 and head 46 need not be so sharp.

Figure 2:
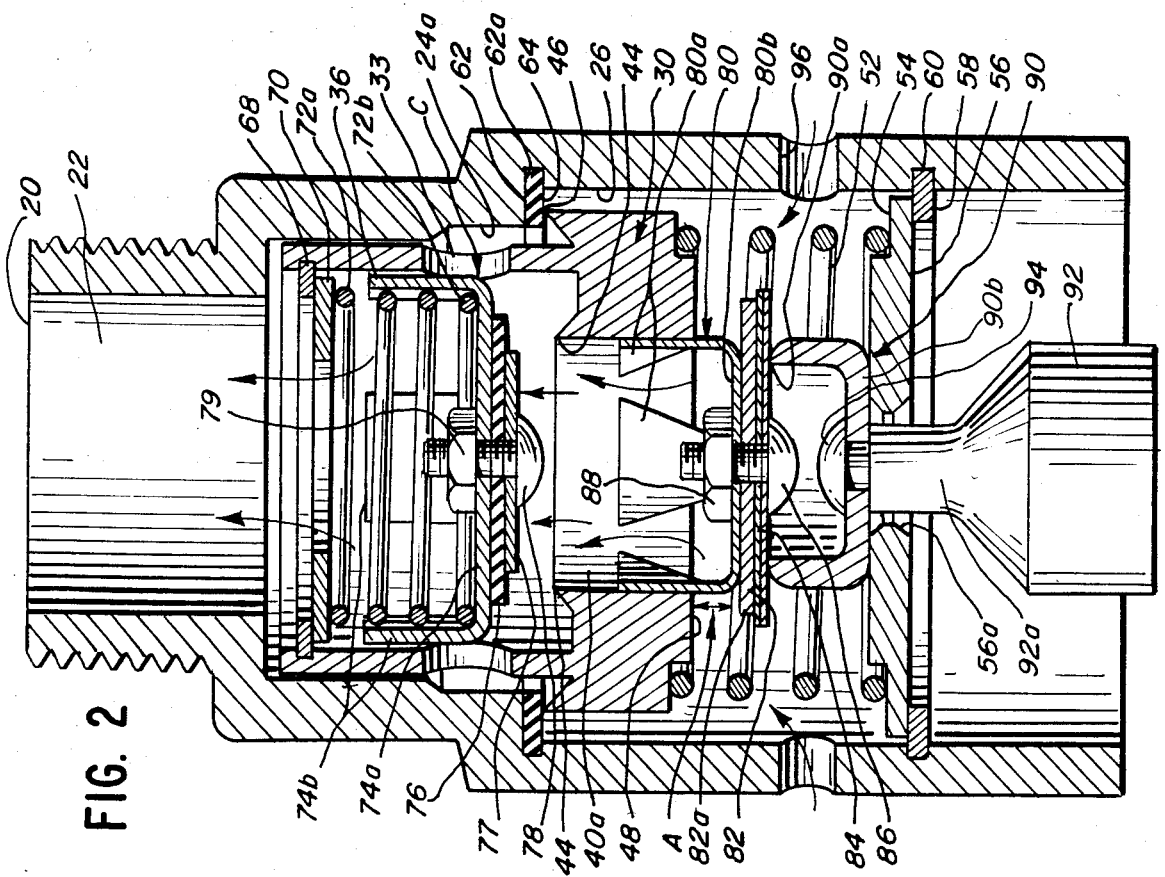
FIG. 2 is a medial sectional view taken through the assembly of FIG. 1 and in a vertical direction therethrough, illustrating the open condition of a pressure relief valve and the fluid flow pattern during pressure relief.

Referring to FIG. 4, pressure valve seat 44 projects toward opening 34 and is located within the bore 36. The vacuum valve head or component 46 also projects toward opening 34 but is located outside the bore 36 so that the body 32 is straddled between valve seat 44 and component 46. Annular surface 40 defines a bore 40a passing through the boss 38. The bore 40a opens through the valve seat 44 at one end and opens at the other end from the annular rear surface 48 of the boss 38. The surface 48 has a recessed shoulder 50 which provides an annular seat for one end of spring 52, as illustrated in FIGS. 1 and 2. The other end of spring 52 is fixed on an annular shoulder 54 formed in a stationary reaction plate 56. Plate 56 is retained in position by engagement with a snap ring 58 which is fitted into a groove 60 recessed into the housing from the lower bore 26.

Referring to FIG. 2, an outwardly flared portion 24a of the bore joins the lower bore 26 at a shoulder 62 which includes a groove 62a in the housing 16. An annular gasket 64 is fitted into the groove 62a and supported on the shoulder 62. The gasket 64 defines a value seat and can be fabricated from an elastomeric material such as an elastomer available from E. I. Du Pont de Nemours & Co. Inc. under the trademark VITON or other gasket material resistant to the particular fluid under storage. The spring 52 applies the required biasing force against the valve member 30 necessary to maintain the vacuum head 46 in engagement with the gasket seat 64 so as to maintain a normally-closed vacuum relief valve condition.

Referring again to FIGS. 1 and 4, the cylindrical body 32 of valve member 30 has an annular groove 66 recessed from the bore 36 proximate the opening 34. As shown in FIG. 1, a snap ring 68 is fitted into the groove 66 to secure the stationary position of a reaction plate washer 70. Washer 70 secures one end 72a of a spring 72. The other end 72b of the spring 72 engages the round, bottom wall 74a of a spring guide 74. The spring guide 74 also includes a cylindrical wall which is interrupted to form four, equally spaced arcuate arms 74b, as illustrated in FIG. 1. The arms 74b project from the bottom wall 74a toward the opposite end of the spring 72. The spring 72 fits within the arms 74b which are free to slide within the valve bore 36 during compression or expansion of the spring to open or close the pressure relief valve.

A circular gasket 76 is secured between the lower surface of the bottom wall 74a and a circular retainer 77 by a bolt 78. Bolt 78 extends through the three elements and is secured by nut 79.

Figure 6:
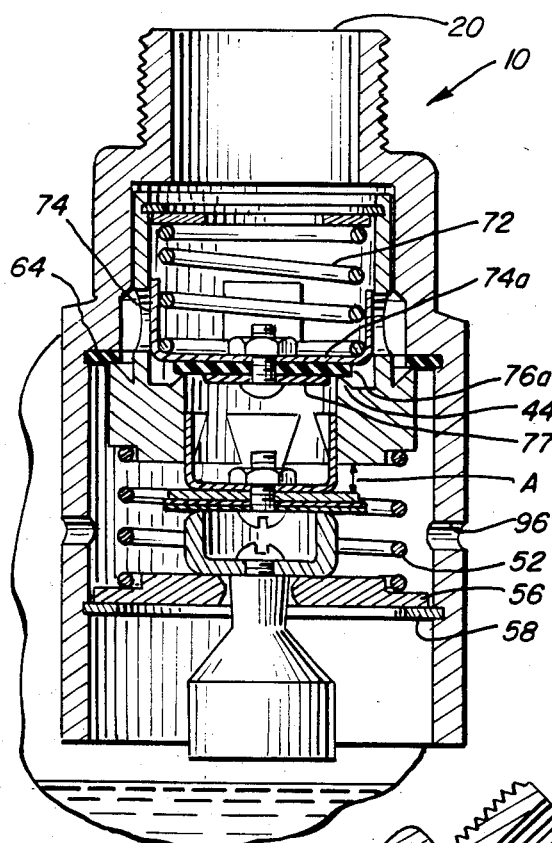
FIG. 6 is a sectional view similar to FIG. 2 illustrating the normally-open gap of the overturn valve shown in FIG. 1.

The retainer 77 is smaller in diameter than the gasket 76 in order to expose the peripheral annular portion 76a. The portion 76a engages the valve seat 44 to form a normally-closed, pressure relief valve which is biased closed by the force of the spring 72 upon the wall 74a and gasket portion 76a, as shown in FIGS. 1 and 6.

As best illustrated in FIG. 2, positioned within the bore 40a are four, slightly flared, arcuate arms 80a which loosely engage the surface 40 to allow slidable movement of an overturn valve guide 80. The arms 80a are integral with a circular, bottom wall 80b from which the arms 80a project toward the valve seat 44. An overturn valve gasket 82 is secured between the bottom of wall 80b and a retainer 84 by a bolt 86 passing through these three elements and a nut 88 which engages the top of the wall 80b. The gasket 82 has a larger diameter than the wall 80b in order to expose the peripheral annular portion 82a. The portion 82a and the rear surface 48 of the valve member 30 are normally spaced apart by gap A to form a normally-open, overturn valve.

The gap A is normally maintained by the action of gravity which draws the guide 80 downwardly within bore 40a so as to space gasket portion 82a from the surface 48. Surface 48 is pressed upwardly by the action of spring 52 upon the valve member 30. In this open position of the overturn valve, the retainer 84 engages the annular top surface 90a of the cylindrical wall of an actuator cup 90. The cup 90 has a bottom wall 90b which is drawn by gravity to engage the stationary plate 56. A central aperture 56a is formed through plate 56. The edges of the aperture 56a are chamfered. A weighted, attitude sensor 92 includes a neck 92a which passes through the aperture 56a and is secured to the cup 90 by a bolt 94 threaded into the neck 92a. The sensor 92 enables gap A of the overturn valve to be closed by the force of gravity.

Referring to FIG. 2, eight ports or passages 96 are provided through the housing 16 selectively located to provide fluid communication between the interior of the tank and the portion of the bore 26 which contains the valving above plate 56. To relieve excessive tank pressure, as illustrated in FIG. 2, the pressurized fluid, typically vapor, initially passes from the tank through the ports 96 into the bore 26 in the direction of the indicated arrows. Then, the pressurized fluid passes along conduit paths through the annular gap A of the normally-open overturn valve and between the arms 80a of the guide 80 through the valve bore 40a in the upward direction indicated by the continuing arrows. From the bore 40a, the pressurized fluid impinges upon and forces the retainer 77 and gasket 76 away from the valve seat 44 to open the normally-closed pressure relief valve against the action of the spring 72. From the valve seat 44, the fluid passes through the narrow clearance space C between the bottom wall 74a and the bore 36, and between the arms 74b in the direction of the arrows leading from the bore 22 to exit through the opening 20 into ambient atmosphere. During this pressure relief operation, any fluid which enters the aperture 33 and the bore 24a is prevented from recirculating into the bore 26 by the closed valve head 46 which is maintained both by the spring 52 and the pressure of the fluid against the surface 48.

The operation to provide vacuum relief from excessively reduced pressure within the tank is illustrated with reference to FIG. 3. Atmospheric fluid, typically air, enters the bore 22 as indicated by the direction of the arrows, and after passing through the aperture in washer 70, impinges upon the bottom wall 74a, as indicated by the continuing arrows. When the fluid pressure in the tank has been reduced to the predetermined negative pressure set by the tension in the spring 52, the atmospheric air pressure on the bottom wall 74a will force the valve seat 44 and the entire valve member 30 downwardly against the action of the spring 52 so as to displace the valve head 46 from engagement with the gasket valve seat 64 and thereby open the vacuum relief valve. When this occurs, air within the bore 36 passes through the apertures 33 and the bore 24a and between the gasket valve seat 64 and valve head 46 of the open vacuum relief valve into the bore 26 in the direction indicated by the continuing arrows. The air then passes outward from the bore 26 through the ports 96 to repressurize the interior of the tank. As a result of the opposing biases of the springs 52 and 72, as well as the imposed fluid pressures, the valve seat 44 and valve head or component 46 cannot open at the same time during either pressure relief or vacuum relief. Thus, both the pressure relief valve and the vacuum relief valve allow only one-way flow.

In the normal vertical orientation of the valve assembly 10 illustrated in FIG. 6, the gap A is maintained by the action of gravity thereby holding the overturn valve normally open, as described with reference to FIGS. 1 and 2. As a result of this normal open condition of the overturn valve, the gap A is not subject to an inadvertent or accidental opening such as from an inadvertent jolt to the valve assembly. Such an undesirable jolt can result from uneven or bumpy road defects during tank transport. However, this invention prevents undesirable fluid leakage during normal trucking or other transport of the fluid storage tank by reason of such adverse road conditions. However, in the event that the fluid storage tank and the valve assembly become partially or entirely overturned, the overturn valve must close the gap A in order to prevent the weight of the stored fluid, typically liquid gasoline, from opening the pressure relief valve by forcing disengagement of the gasket 76 from the valve seat 44; this condition could result in leakage from the opening 20.

Figure 7:
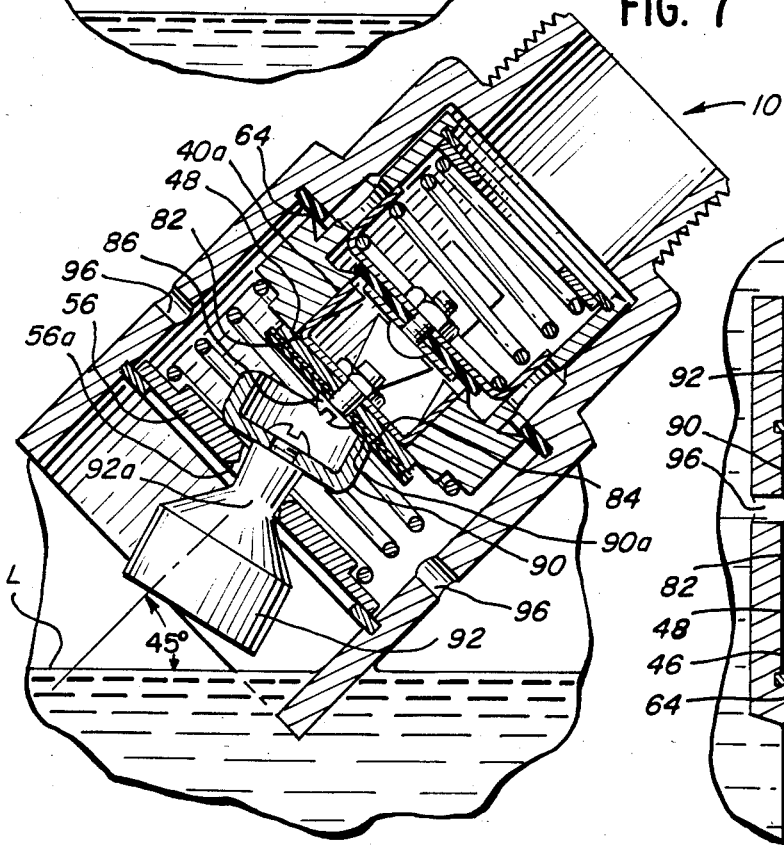
FIG. 7 is a sectional view similar to FIG. 6 illustrating the valve assembly inclined at 45° and the overturn valve in closed condition.

Referring to FIG. 7, when the valve assembly 10 is inclined to an angle of approximately 45° with respect to normal liquid level L, gravity action upon the weighted sensor 92 and the connected cup 90 will tend to retain their vertical position in opposition to the incline of the remaining valve assembly. The chamfered edges of the aperture 56a form a rotational fulcrum to faciliate free tilting of the neck 92a relative to plate 56. The relative inclination of the cup 90 causes a portion of the annular wall 90a to slide across the retainer 84 inwardly toward the bolt 86, thereby moving the gasket 82 into engagement with the surface 48 to eliminate the gap A therebetween. Thus, the overturn valve closes when the incline of the mechanism 10 reaches approximately 45 degrees, as illustrated in FIG. 7. When the overturn valve has closed, no fluid can leak through the bore 40a.

Figure 8:
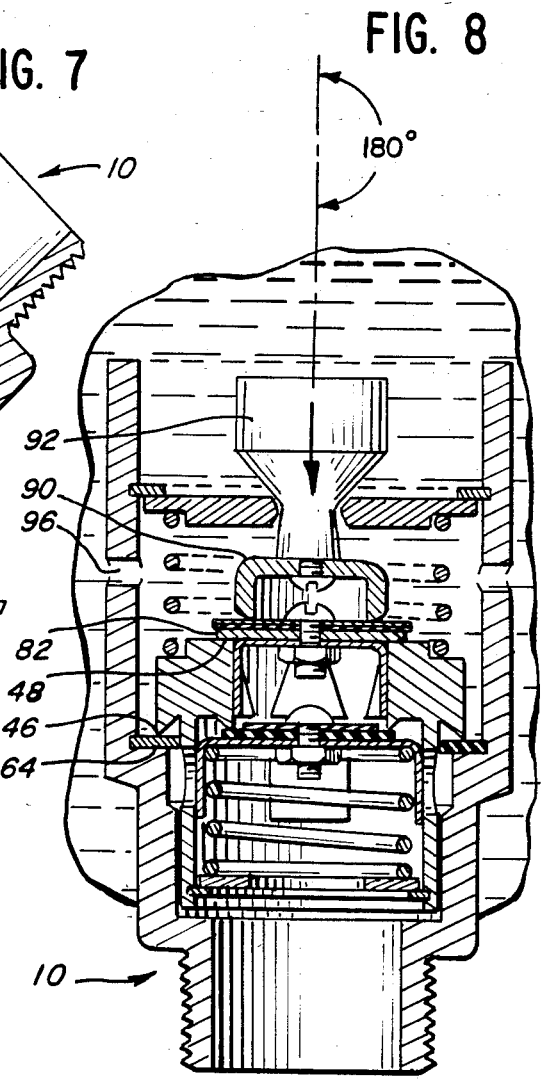
FIG. 8 is a sectional view similar to FIG. 6 illustrating the valve assembly overturned 180°.

Referring to FIG. 8, if the mechanism 10 is rolled-over 180 degrees, the combined fluid pressure and weight of the connected cup 90 and sensor 92 ensure tight engagement of the gasket 82 upon the surface 48 as well as the tight engagement of head 46 upon the gasket valve seat 64, thereby maintaining the respective closure of both the overturn valve and vacuum relief valve.

When the overturn valve is not necessary or included in the valve mechanism, for example when the mechanism is installed on a stationary tank which requires only pressure relief venting, the overturn valve can be omitted by simply omitting the bolted assembly of the gasket 82, guide 80 and retainer 84 as well as the bolted assembly of the cup 90 and sensor 92. Elimination of these overturn valve elements will have no adverse effect on the proper operation of the pressure relief and vacuum relief valves.

Variations in the size and structural features of the cooperating parts and material used may occur to the skilled artisan without departing from the scope of the invention which is set forth in the claims hereto appended.

I claim:

1. A valve mechanism for relief of excessive pressure or vacuum in the interior of a closed fluid storage tank, said mechanism adapted to be installed in a vent opening in a wall of the tank and exposed to said tank interior, comprising:

A. a valve housing having a bore therethrough including an opening at one end thereof communicating with ambient atmosphere at said vent opening, passage means in said housing for communicating said bore with said tank interior, and a first valve seat within said bore;

B. a unitary valve member movably positioned within the bore of said housing, said valve member including at least a second valve seat and a separate valve component integral therewith, and conduit means for communicating between the interior of the valve member and valve housing; and C. spring means biasing said unitary valve member toward engagement of said valve component with said first valve seat, and spring biased valving means engageable with said second valve seat to form separate, respective first and second normally-closed operable valves in the bore of the valve housing, said first valve being independently operable to establish communication between the tank interior and ambient atmosphere through said passage means, said bore, said conduit means and vent opening for relief of excessive pressure within said tank interior, said second valve being independently operable to establish communication between ambient atmosphere and said tank interior through said vent opening, said conduit means, said bore and said passage means to relieve excessive vacuum within said tank interior without spillage of the fluid product in the tank, and D. a third valve seat formed on said unitary valve member, and an overturn valve operably installed in the bore and in cooperation with said third valve seat on said unitary valve member for closing movement between said overturn valve and said third valve seat for preventing fluid product leakage through the vent opening when said tank is excessively tilted or overturned or said tank is jolted during transport thereof.

2. The valve mechanism of claim 1 in which said overturn valve comprises attitude-sensitive means supported in the bore of the housing in a normally upright orientation coaxial with the bore, valve closure means including gasket means, means mounting said gasket means for movement relative to said unitary valve member and for biasing said gasket member away from said third valve seat to maintain the overturn valve normally open, said attitude-sensing means operable to displace the gasket means into engagement with the third valve seat on said valve member to close the overturn valve thereby to prevent fluid product leakage.

3. The valve mechanism of claim 2 in which said valve closure means includes a reaction plate supported in the housing and spring means supported on the plate in engagement with the valve member, said attitude-sensitive means being supported on the reaction plate maintained in said normally upright orientation by gravity.

4. The valve mechanism of claim 1 in which said overturn valve includes a guide means slidably installed in the unitary valve member, said guide means including gasket means associated therewith and normally disengaged from the third valve seat and engaged with said third valve seat when the tank is excessively tilted or overturned.

5. The valve mechanism of claim 1 in which said unitary valve member comprises a generally cylindrical body with a circumferential wall and opposed ends, said second valve seat and said separate valve component formed adjacent one end of said body, said second valve seat and said separate valve component being offset from and located on opposite sides of the circumferential wall of said body, said third valve seat being formed on said one end.

6. A pressure and vacuum relief valve mechanism for a fluid storage tank, said mechanism adapted to be installed in a wall of the tank and exposed to pressure and vacuum conditions in the interior of the tank, said mechanism comprising:
A. an integral housing having a central bore therethrough opening to opposite ends of the housing which in the installed condition of the mechanism provides one end opening to ambient atmosphere through said wall and a second end opening into communication with said tank interior above the stored fluid;
B. an integral valving member slidably installed within said bore having a valve seat and a separate valve component of which one functions as an excessive pressure relieving valve and one functions as an excessive vacuum relieving valve;
C. valving means selectively engageable with the respective valve seat and valve component for opening and closing the valve thereat, said means constructed and arranged to maintain said valve mechanism normally closed;
D. said housing and valving member having conduit ports selectively located therethrough and capable of communicating said tank interior and bore to ambient atmosphere when the excessive pressue relief valve is opened and ambient atmosphere with said bore and the tank interior when said excessive vacuum pressure valve is opened, said valves being operable automatically upon occurrence of excessive pressure and vacuum conditions in the tank interior without spillage of the fluid product stored in the tank; and
E. said integral valving member including an overturn valve seat thereon, and said housing including overturn valving means cooperable with said overturn valve seat to prevent stored fluid leakage through said mechanism in the event the tank is adversely tilted or rolled-over, said overturn valving means being movable from a normally-open position remote from said overturn valve seat on said integral valve member to a closed position against the integral valve member and said overturn valve seat thereon.

7. A valve mechanism for relief of excessive pressure or vacuum in the interior of a closed fluid storage tank, said mechanism adapted to be installed in a vent opening in a wall of the tank and exposed to said tank interior, comprising:
a valve housing having a bore therethrough including an opening at one end thereof communicating with ambient atmosphere at said vent opening, passage means in said housing for communicating said bore with said tank interior and a first valve seat within said bore; a unitary valve member movably positioned within the bore of said housing, said unitary valve member including a central bore and second and third separate valve seats and a separate integral valve component, spring means biasing said unitary valve member to engage said valve component with said first valve seat to define a first normally closed operable valve, spring biased valving means on said valve member engageable with said second valve seat to define a second normally-closed operable valve, an overturn valve cooperatively related to said unitary valve member and movable from a normally-open position remote from said third valve seat to a closed position against said third valve seat, and an attitude-sensitive means supported in the bore of said housing and responsive to overturn movement to move said valve member mounted overturn valve to the closed position against the valve member mounted third valve seat.

8. The valve mechanism of claim 7 wherein said third valve seat is defined on the surface of said valve member about the bore therein, said overturn valve comprising a gasket which, in said closed position, engages the surface of the valve member about the bore therein, said gasket freely resting on said attitude-sensitive means, and movable from the normally-open position thereof to the closed position thereof is response to movement of said attitude-sensitive means toward an overturn position.

* * * * *